US008197705B2

(12) United States Patent
Kishimoto et al.

(10) Patent No.: US 8,197,705 B2
(45) Date of Patent: Jun. 12, 2012

(54) METHOD OF PROCESSING SILICON SUBSTRATE AND METHOD OF MANUFACTURING LIQUID DISCHARGE HEAD

(75) Inventors: Keisuke Kishimoto, Yokohama (JP); Hirokazu Komuro, Yokohama (JP); Satoshi Ibe, Yokohama (JP); Takuya Hatsui, Tokyo (JP); Kazuhiro Asai, Kawasaki (JP); Shimpei Otaka, Yokohama (JP); Hiroto Komiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 903 days.

(21) Appl. No.: 12/203,536

(22) Filed: Sep. 3, 2008

(65) Prior Publication Data

US 2009/0065481 A1 Mar. 12, 2009

(30) Foreign Application Priority Data

Sep. 6, 2007 (JP) ................................ 2007-231354
Sep. 6, 2007 (JP) ................................ 2007-231355

(51) Int. Cl.
*G01D 15/00* (2006.01)
*G11B 5/127* (2006.01)

(52) U.S. Cl. ............ 216/87; 216/67; 438/589; 438/700; 438/701; 438/714; 438/9; 136/255; 136/256

(58) Field of Classification Search .................... 438/73, 438/21, 155, 515, 766, 475, 585, 739, 460, 438/31, 462; 216/27, 99, 41, 870; 347/65, 347/61; 340/572.1; 117/8; 29/890.1; 73/754
See application file for complete search history.

(56) References Cited

U.S. PATENT DOCUMENTS

| | | | | |
|---|---|---|---|---|
| 6,139,761 | A | 10/2000 | Ohkuma | |
| 6,229,640 | B1 * | 5/2001 | Zhang | 359/290 |
| 6,648,454 | B1 | 11/2003 | Donaldson et al. | |
| 7,207,109 | B2 | 4/2007 | Tokunaga et al. | |
| 7,250,113 | B2 | 7/2007 | Komuro et al. | |

(Continued)

FOREIGN PATENT DOCUMENTS

JP 59-182529 A 10/1984

(Continued)

OTHER PUBLICATIONS

J. Bonse, All-optical characterization of single fentosecond laser-pulse-induced amorphization in silicon, Appl. Phys. A 84, 63 (2006) pp. 63-66.*

*Primary Examiner* — Duy Deo
*Assistant Examiner* — Erin Flanagan
(74) *Attorney, Agent, or Firm* — Fitzpatrick, Cella, Harper & Scinto

(57) ABSTRACT

A method of manufacturing a substrate for a liquid discharge head having a silicon substrate in which a liquid supply port is provided includes providing the silicon substrate, an etching mask layer having an aperture being formed on one surface of the silicon substrate, forming a region comprising an amorphous silicon in the interior of the silicon substrate by irradiating the silicon substrate with laser light, forming a recess, which has an opening at a part of a portion exposed from the aperture on the one surface, from the one surface of the silicon substrate toward the region, and forming the supply port by performing etching on the silicon substrate in which the recess and the region have been formed from the one surface through the aperture of the etching mask layer.

13 Claims, 6 Drawing Sheets

U.S. PATENT DOCUMENTS

| | | | | |
|---|---|---|---|---|
| 2006/0094200 | A1* | 5/2006 | Leith et al. | 438/424 |
| 2006/0258047 | A1 | 11/2006 | Nishiwaki et al. | |
| 2008/0076197 | A1 | 3/2008 | Komuro et al. | |
| 2008/0094454 | A1 | 4/2008 | Koyama et al. | |
| 2009/0065472 | A1 | 3/2009 | Asai et al. | |
| 2009/0065473 | A1 | 3/2009 | Ibe et al. | |
| 2009/0065476 | A1 | 3/2009 | Komiyama et al. | |
| 2009/0065482 | A1 | 3/2009 | Komiyama et al. | |

FOREIGN PATENT DOCUMENTS

| | | | |
|---|---|---|---|
| JP | 2003-258285 | A | 9/2003 |
| JP | 2004-255869 | A | 9/2004 |
| JP | 2005-116844 | A | 4/2005 |
| JP | 2006-315017 | A | 11/2006 |
| WO | WO 2006/130914 | * | 12/2006 |

* cited by examiner

METHOD OF PROCESSING SILICON SUBSTRATE AND METHOD OF MANUFACTURING LIQUID DISCHARGE HEAD

BACKGROUND OF THE INVENTION

1. Field of the Invention

The present invention relates to a silicon substrate processing method for forming a penetrated hole on a silicon substrate and a method of manufacturing a liquid discharge head that discharges a liquid such as an ink onto a recording medium such as a recording sheet.

2. Description of the Related Art

As a liquid discharge head that discharges ink in the form of liquid, a type of liquid discharge head that discharges ink upwardly with respect to the heater that generates discharge energy is known. (This type of head will be hereinafter referred to as the side shooter type head.) This side shooter type head has a configuration in which a penetrated hole is provided in a silicon substrate on which heaters are formed and ink is supplied from the back side opposite to the surface on which the heaters are formed, through an elongated ink supply port in the form of a penetrated hole.

In the side shooter type head, the ink supply port that penetrates the silicon substrate may be formed, for example, by the method disclosed in U.S. Pat. No. 6,139,761. U.S. Pat. No. 6,139,761 teaches to form an ink supply port on a silicon substrate having a <100> surface of the orientation of crystal plane by anisotropic etching using a strong alkaline solution. In this anisotropic etching of the silicon substrate, the ink supply port is formed utilizing a difference in the solubility of the silicon substrate to the strong alkaline solution between the surface of a crystal plane orientation of <100> and the surface of a crystal plane orientation of <111>.

In the process of forming an ink supply port in a silicon substrate by anisotropic etching using a strong alkaline solution, etching process takes a relatively long time, which is one of the factors that deteriorate the efficiency of production of liquid discharge heads.

In addition, as shown in FIG. 4, the ink supply port 106 formed by anisotropic etching has a tapered cross-sectional shape in which the opening sectional area gradually decreases from the back surface toward the front surface at the angle of 54.7° formed by the <111> surface. In other words, the opening width of the ink supply port 106 on the back surface of the silicon substrate 101 is larger than the opening width of the ink supply port 106 on the front surface of the silicon substrate 101 on which heaters 103 are provided. Consequently, the lateral width (or the shorter side dimension of the elongated ink supply port) of the device substrate (i.e. the substrate for liquid discharge head) that constitutes a liquid discharge head having heaters and nozzles for discharging ink depends on the opening width of the ink supply port on the back surface of the silicon substrate. Thus, the largeness of the lateral width of the inkjet chip leads to an increase in the manufacturing cost of the liquid discharge head. Therefore, in order to reduce the manufacturing cost, it is necessary to make the opening width of the ink supply port on the back surface of the inkjet chip smaller thereby reducing the lateral width of the inkjet chip.

To achieve this, there has been developed a method in which an ink supply port having walls that are perpendicular to the front and back surfaces (principal surfaces) of a silicon substrate is formed by dry etching. Furthermore, for example U.S. Pat. No. 6,648,454 discloses a method in which dry etching and anisotropic etching are performed in combination to form walls of an ink supply port that are perpendicular to the front and back surfaces of a silicon substrate.

However, in cases where dry etching is used in the process of forming an ink supply port as described above, the etching process takes a relatively long time. Therefore, it is demanded to reduce the etching time to improve the production efficiency.

SUMMARY OF THE INVENTION

In view of the above, an object of the present invention is to provide a method of processing a silicon substrate and a method of manufacturing a substrate for a liquid discharge head with which the opening of a penetrated hole on the back surface of a silicon substrate can be made small and such a penetrated hole can be formed with high efficiency.

According to an exemplary mode of the present invention, there is provided a method of manufacturing a substrate for a liquid discharge head including a silicon substrate in which a liquid supply port is provided, comprising: providing the silicon substrate, an etching mask layer having an opening being formed on a one surface of the silicon substrate; forming a region comprising an amorphous silicon in the interior of the silicon substrate by irradiating the silicon substrate with laser light; forming a recess, which has an opening at a part of a portion exposed from said opening on said one surface, from said one surface of the silicon substrate toward the region; and forming the supply port by performing etching on the silicon substrate in which the recess and the region have been formed from said one surface through the opening of the etching mask layer.

Further features of the present invention will become apparent from the following description of exemplary embodiments with reference to the attached drawings.

DESCRIPTION OF THE EMBODIMENTS

Figure 1:
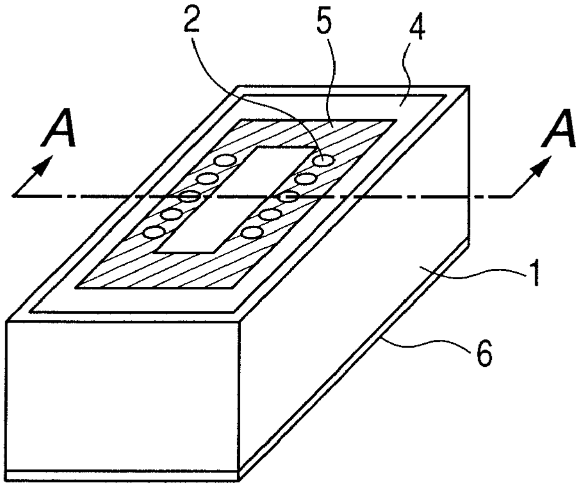
FIG. 1 is a perspective view schematically showing a portion of an inkjet head.

Preferred embodiments of the present invention will now be described in detail in accordance with the accompanying drawings. In the following description, components having the same functions will be denoted with the same reference numerals, and description thereof will be omitted in some cases.

The method of processing a silicon substrate according to the present invention is preferably used in a process of manufacturing a structure including a silicon substrate, in particular a device such as a liquid discharge head, to form a penetrated hole like a liquid supply port of the liquid discharge head on the silicon substrate. The method of the present invention is characterized in that a silicon substrate on which a liquid supply port is to be formed is irradiated with a laser beam prior to etching of the silicon substrate, whereby a transformed layer in the form of a region comprising an amorphous silicon that is made amorphous and a leading hole in the form of a non-penetrated hole or a recess are formed in the interior of the silicon substrate.

The liquid discharge head can be used as an inkjet recording head. In addition, the liquid discharge head can be used in producing a biochip or printing an electronic circuit.

First Embodiment

The silicon substrate processing method according to this embodiment includes a step of providing the silicon substrate, an etching mask layer having an opening being formed on a back surface of the silicon substrate, a step of producing a transformed layer in the silicon substrate by irradiation with a laser beam, and a step of forming a plurality of leading holes in the form of non-penetrated holes by irradiation with a laser beam. This processing method further includes a step of forming a penetrated hole that reaches the front surface of the silicon substrate by performing anisotropic etching on the silicon substrate in which the leading holes and the transformed layer have been formed.

FIG. 1 is a perspective view showing a part of a substrate for an inkjet head as an example of the substrate for liquid discharge head according to the present invention. As shown in FIG. 1, electricity-heat transducing elements (TaN) 2 that constitute heaters serving as discharge energy generating elements that generate energy for discharging liquid are arranged on the front surface of the silicon substrate 1 having a crystal axis of <100>. Furthermore, a SiN layer 4 and a Ta layer 5 serving as protection layers for the electricity-heat transducing elements 2 are formed in layers on the front surface of the silicon substrate 1.

The electricity-heat transducing elements 2 are electrically connected with control signal input electrodes (not shown) for driving the elements 2. The thickness of the silicon substrate 1 is approximately 625 μm. Although the description of this embodiment will be directed to a discrete silicon substrate 1 that constitutes a part of a substrate for an inkjet head, the same processing is actually performed on an object in the form of a wafer.

FIGS. 2A to 2G are cross sectional views taken along line A-A in FIG. 1. As shown in FIGS. 2A to 2G, an etching mask layer 6 having an opening 7 has been formed on the back surface of the silicon substrate 1 by laminating a polyether amide resin on the $SiO_2$ layer 1*a* of the silicon substrate 1. The region within the opening 7 is to be etched.

Figure 2A:
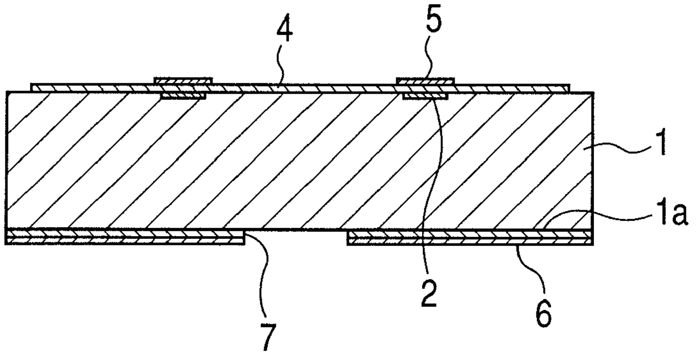
FIGS. 2A, 2B, 2C, 2D, 2E, 2F and 2G are schematic cross sectional views showing an example of the method of manufacturing a substrate for inkjet head according to the exemplary mode of the present invention.
Figure 2B:
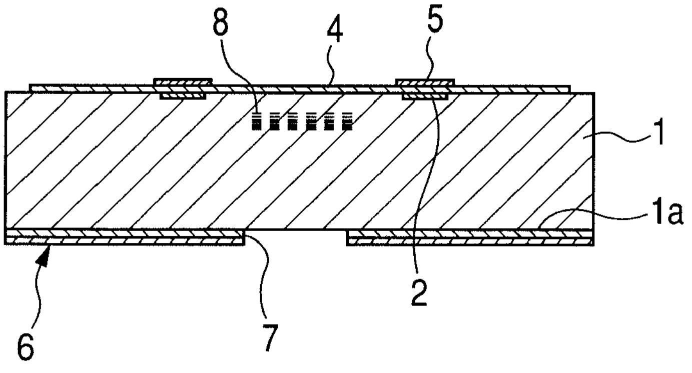

First, the silicon substrate 1 is irradiated with laser beams that are directed to the region within the opening 7 of the etching mask layer 6 from the back side to the front side of the silicon substrate 1, whereby a transformed layer 8 that is made amorphous is formed inside the silicon substrate 1, as shown in FIG. 2B. In this process, the laser beams are focused at positions of a depth of approximately 500 μm from the back surface of the silicon substrate 1, and the transformed layer 8 in the form of rows extending along the longer side direction of the silicon substrate (substrate for liquid discharge head) 1 is formed by laser processing utilizing multi-photon absorption. In other words, the transformed layer 8 is formed in rows along the direction of the longer side of the ink supply port in the form of an elongated penetrated hole to be formed in the silicon substrate 1. The transformed layer 8 is made amorphous, whereby its etching rate is made relatively higher.

In this embodiment, the transformed layer 8 was formed in six rows along the longer side of the silicon substrate 1 in a plane parallel to the front (or back) surface of the silicon substrate 1. The rows of the transformed layer 8 thus formed were arranged at a pitch of 36 μm in the direction of the shorter side of the silicon substrate 1 and had a length of approximately 8.6 mm along the direction of the longer side of the silicon substrate 1. The transformed layer 8 was formed using laser beams of the basic wave (having a wavelength of 1060 nm) of the YAG laser. The output power and the frequency of the laser beams were adjusted appropriately.

In this embodiment, the process of producing the transformed layer 8 was performed using laser beams of the basic wave (having a wavelength of 1060 nm) of the YAG laser. However, the laser beams used in this process is not limited to them, but other laser beams may be used insofar as multi-photon absorption using the laser beams can be achieved with the silicon material of which the silicon substrate 1 is made. For example, multi-photon absorption processing for silicon can also be achieved with a femtosecond laser. The transformed layer may be formed using such a laser.

In the process of forming the transformed layer 8, it is preferred that the transformed layer 8 be formed at a depth position within the range of 5% to 50% of the thickness of the silicon substrate 1 from the front surface of the silicon substrate 1. That is, in other words, at a depth position within the range of 50% to 95% from the back surface (surface from which etching proceeds) of the silicon substrate 1. Forming the transformed layer at a position deeper than 50% from the back surface (i.e. the surface from which etching proceeds) of the silicon substrate 1 is advantageous in that the supply port can be formed at high speed. It is more preferable that the transformed layer be formed at a position deeper than 80%.

Figure 2C:
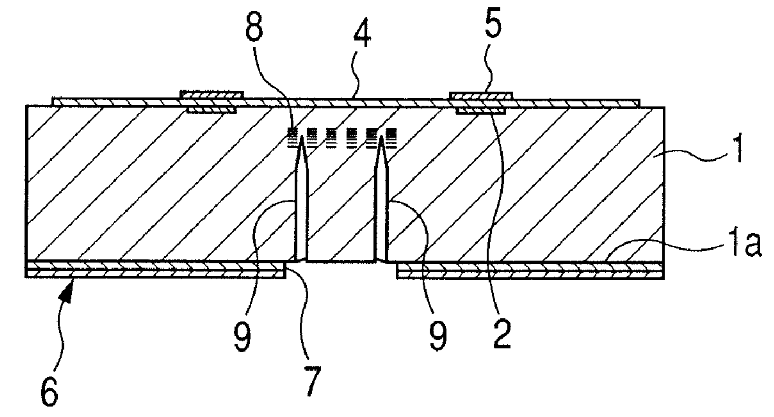

Next, the silicon substrate 1 is irradiated with laser beams from the back side, whereby a plurality of leading holes 9 in the form of non-penetrated holes that do not penetrate through the silicon substrate from the back surface to the front surface thereof are formed from the back surface toward the front surface of the silicon substrate 1, as shown in FIG. 2C. In the process of forming the leading holes 9, laser beams of the third harmonic generation wave (THG, having a wavelength of 355 nm) of the YAG laser were used to form the leading holes 9. The output power and the frequency of the laser beams were adjusted appropriately. In this embodiment, the leading holes 9 thus formed had a diameter ϕ of approximately 40 μm. It is preferred that the diameter ϕ of the leading holes 9 be within the range of, approximately, 5 μm to 100 μm. Leading holes having too small diameters are not desirable, because in this case, etching liquid is hard to be introduced into the leading holes in the anisotropic etching process that is to be performed in the succeeding process. On the other hand, leading holes having too large diameters are not desirable, because in this case, it takes a relatively long time to form leading holes having a desired depth. The depth of the leading holes 9 thus formed were within the range of, approximately, 500 μm to 575 μm from the back surface of the silicon substrate 1.

Figure 3:
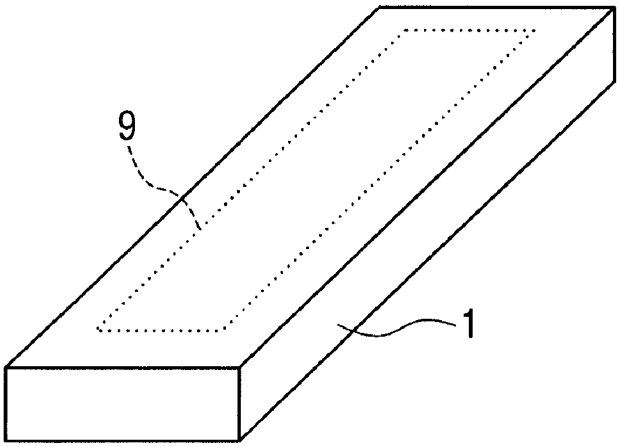
FIG. 3 is a perspective view schematically showing a silicon substrate in which a plurality of leading holes has been formed.
Figure 4:
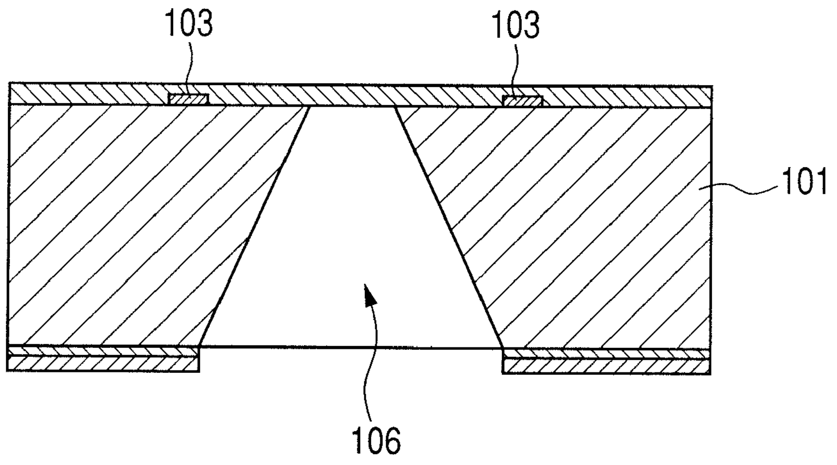
FIG. 4 is a cross sectional view schematically showing a conventional ink supply port penetrating through a silicon substrate.

The plurality of leading holes 9 thus formed were arranged in a rectangular frame-like pattern so as to surround the transformed layer 8 along the outer periphery of the area of the transformed layer 8 formed inside the silicon substrate 1 that is parallel to the surface of the silicon substrate 1. Specifically, the plurality of leading holes 9 were formed in two rows that are parallel to the direction of the longer side of the silicon substrate 1 at a pitch of 33 μm in the direction of the longer side. At both ends of the two rows of the leading holes 9 with respect to the longitudinal direction were also formed a plurality of leading holes 9 arranged at the same pitch over a length of 150 μm in the direction of the shorter side of the silicon substrate 1. FIG. 3 shows the silicon substrate in which the leading holes 9 have been formed in a perspective view seen from the back side. This silicon substrate is to constitute a part of a liquid discharge head.

In this embodiment, the leading holes 9 were formed by processing using laser beams of the third harmonic generation wave (THG, having a wavelength of 355 nm) of the YAG laser. However, the laser beams used to form the leading holes 9 are not limited to this kind of laser beams, but other laser beams may be used insofar as they have a wavelength with which holes can be formed in the silicon material of which the silicon substrate 1 is made. For example, the silicon has a relatively high absorptivity also to laser beams of the second harmonic generation wave (SHG, having a wavelength of 532 nm) of the YAG laser as well as THG, and such laser beams may also be used to form the leading holes. Alternatively, the leading holes may be formed by ablation by laser beams, or what is called laser ablation method. In the process of forming the leading holes, the holes may be formed by spiral processing in which the irradiation position is displaced by displacing the laser beams.

It is preferred that the depth of the leading holes 9 with respect to the thickness direction of the silicon substrate 1 be designed in such a way that the ends of the leading holes are positioned at the same depth as the transformed layer 8. In other words, it is desirable that the leading holes 9 be formed in such a way that ends of the leading holes 9 reach the depth of the transformed layer 8. If the ends of the leading holes 9 do not reach the transformed layer 8, there is a possibility that wet etching in a later process step cannot be performed expeditiously, which is undesirable.

Next, anisotropic etching was performed on the silicon substrate 1 in which the transformed layer 8 and the leading holes 9 have been formed by laser processing. The anisotropic etching was wet etching using an alkaline solution such as tetra methyl ammonium hydroxide (TMAH). Wet etching enables simultaneous processing of several dozens of silicon substrates, which is preferable from the viewpoint of throughput.

Figure 2D:
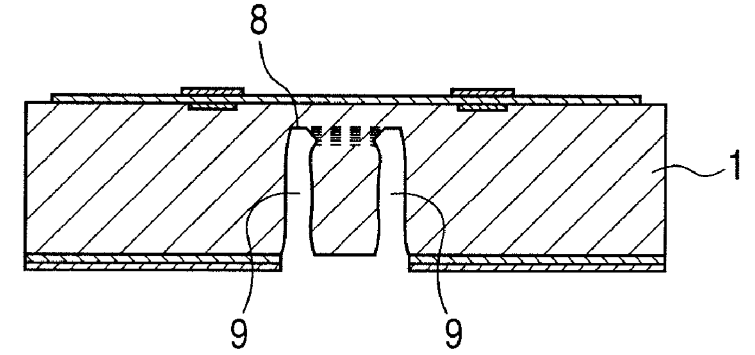
Figure 2E:
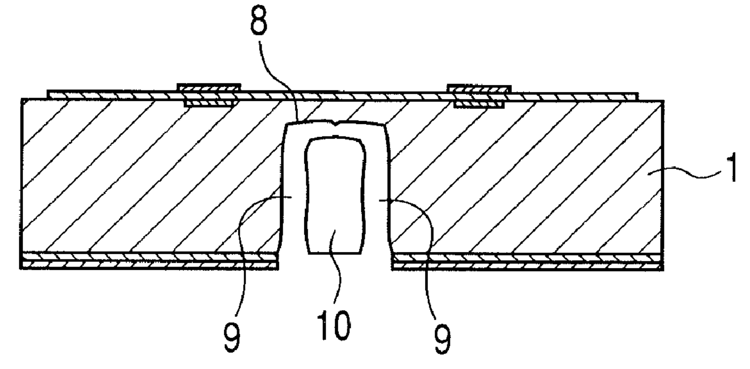
Figure 2F:
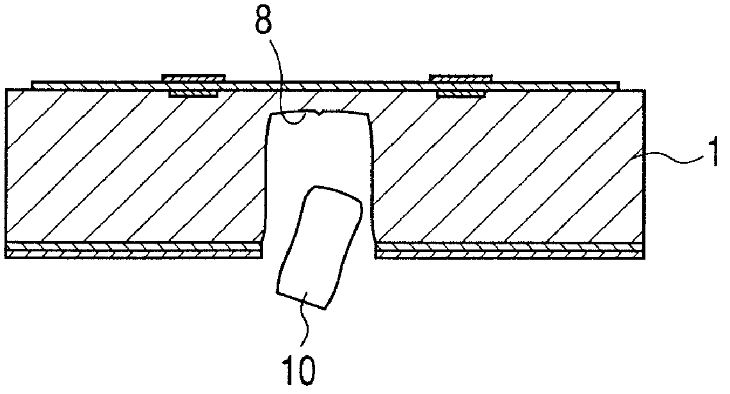

In the wet etching of the silicon substrate 1 that has been laser processed, etching solution first enters the interior of the leading holes 9, and etching proceeds in the interior of the leading holes 9, as shown in FIG. 2D. Subsequently, etching solution reaches the transformed layer 8. Then, since the crystal structure of the transformed layer 8 has been broken by multi-photon absorption processing, the etching rate of the transformed layer 8 is higher than the other portions. Therefore, etching proceeds dominantly in the transformed layer 8, as shown in FIG. 2E. Consequently, the region surrounded by the transformed layer 8 and the leading holes 9 is removed as a chip like piece of silicon 10, as shown in FIG. 2F. Thus, wet etching for forming a penetrated hole (i.e. ink supply port) in the silicon substrate 1 can be completed in a relatively short time.

Figure 2G:
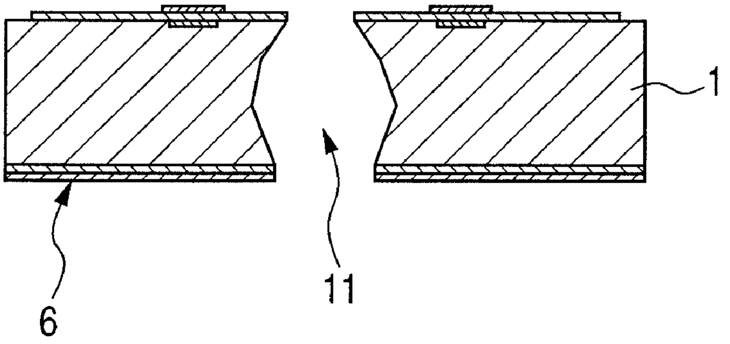

After the silicon piece 10 has been removed, wet etching was performed until an ink supply port 11 penetrating through the silicon substrate 1 to its front surface was formed. Furthermore, the SiN layer 4 provided on the opening portion of the ink supply port 11 on the front surface of the silicon substrate 1 was removed by dry etching. Thus, the ink supply port 11 that opens at the front surface of the silicon substrate 1 was formed (FIG. 2G).

In the above described embodiment, twenty-five silicon substrates 1 were wet-etched simultaneously. The etching process took five hours. The processing time per silicon substrate including the time for laser processing was approximately 20 minutes.

Conventionally, in cases where silicon substrates are processed by dry etching, it takes 40 to 60 minutes to process one silicon substrate, and in cases where dry etching and wet etching are performed in combination, it takes 30 to 50 minutes to process one silicon substrate. This means that according to the silicon substrate processing method according to this embodiment, an ink supply port having a relatively narrow opening on the back surface of the silicon substrate could be formed more efficiently as compared to the conventional processing methods.

As described above, the silicon substrate processing method according to this embodiment includes a step of producing a transformed layer 8 in the interior of a silicon substrate 1, a step of forming a plurality of leading holes 9 and a step of forming an ink supply port 11 in the form of a penetrated hole by performing anisotropic etching on the silicon substrate 1 in which the leading holes 9 and the transformed layer 8 have been formed. By this method, the opening of the ink supply port 11 on the back surface of the silicon substrate 1 can be made small, and the ink supply port 11 can be formed efficiently. Therefore, according to this embodiment, the processing speed in forming the ink supply port 11 can be increased, and the cost of manufacturing inkjet heads can be reduced.

Figure 6:
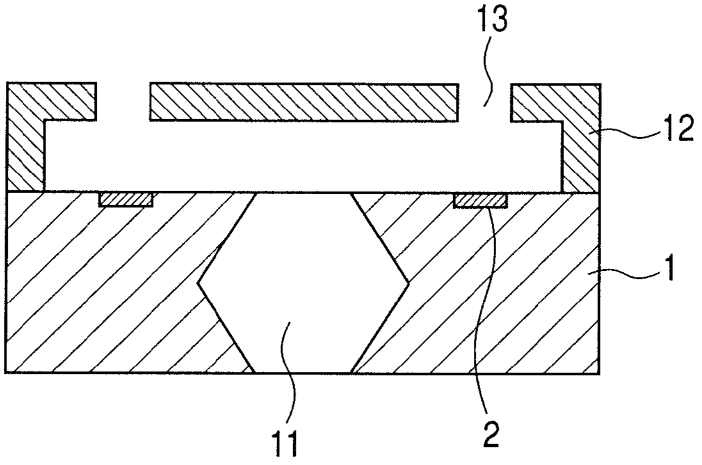
FIG. 6 is a schematic cross sectional view of an example of the inkjet head according to the present invention.

In the above described embodiment, an exemplary processing of forming an ink supply port 11 in a silicon substrate 1 has been described. In the case where an ink jet head is manufactured, it is preferred that a process of forming an ink flow path forming member on the front surface of a silicon substrate 1 be performed prior to the process of forming an ink supply port 11 performed in this embodiment. For example, as shown in FIG. 6, an ink flow passage forming member 12 having a discharge port 13 for discharging ink in the form of liquid and an ink flow path as a liquid flow passage that is in communication with the discharge port 13 may be formed on the front surface of the silicon substrate 1.

Second Embodiment

Figure 5A:
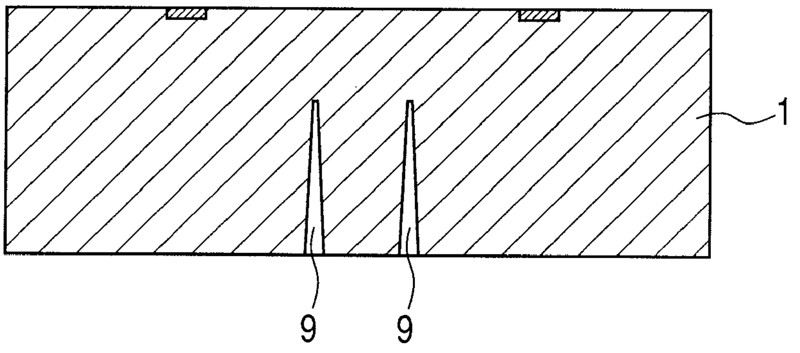
FIGS. 5A and 5B are schematic cross sectional views of an example of the method of manufacturing a substrate for inkjet head according to the exemplary mode of the present invention.
Figure 5B:
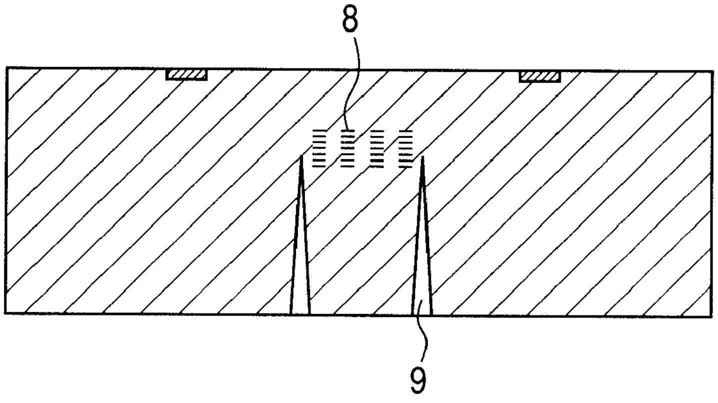

In the second embodiment, as shown in FIG. 5A, a process of forming leading holes 9 is performed prior to a process of producing a transformed layer 8. Then, a transformed layer 8 is formed at the ends of the leading holes 9, as shown in FIG. 5B. Subsequently, a series of processes is performed in the same manner as in the first embodiment to form an ink supply port in a silicon substrate.

In the process of forming leading holes in this embodiment, a plurality of leading holes are formed in such a way that they are arranged in a frame-like pattern like that described above in a plane parallel to the front surface of the silicon substrate. Subsequently, in the process of producing a transformed layer, the transformed layer is formed within the frame defined by the plurality of leading holes formed in the silicon substrate. Then, wet etching is performed on the silicon substrate in which the leading holes and the transformed layer have been formed to produce an ink supply port that penetrates through the silicon substrate to its front surface.

The processing time of wet etching in this embodiment was five hours, which is the same as that in the first embodiment. This means that the time taken in forming an ink supply port can be reduced, whichever process is performed earlier among the process of producing the transformed layer 8 and the process of forming leading holes 9.

Third Embodiment

Figure 7A:
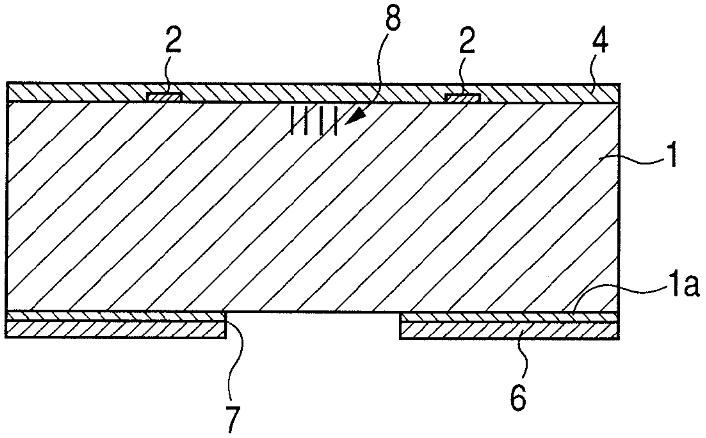
FIGS. 7A, 7B and 7C are schematic cross sectional views showing an example of the method of manufacturing a substrate for inkjet head according to the exemplary mode of the present invention.
Figure 8:
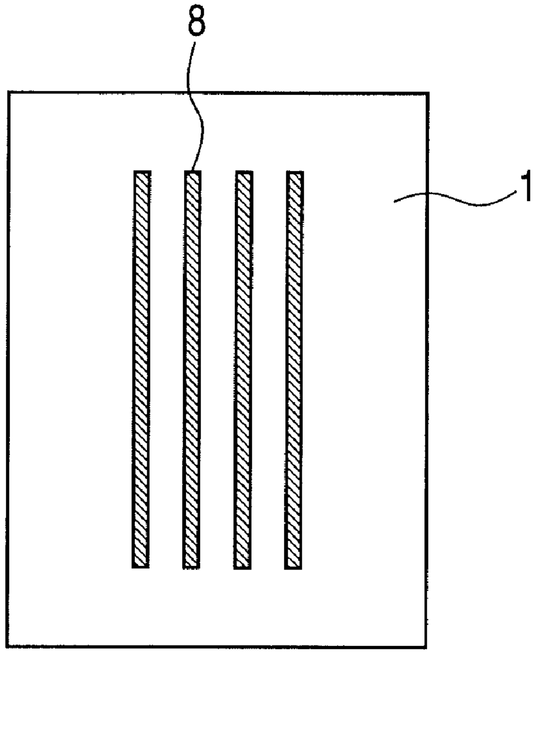
FIG. 8 is a schematic diagram for illustrating a process step in the method of manufacturing a substrate for inkjet head according to the exemplary mode of the present invention.

As shown in FIG. 7A, a <100> silicon substrate 1 is irradiated with laser beams that are directed to an opening 7 of an etching mask layer 6 from the back side to the front side of the silicon substrate 1 to produce a transformed layer 8 that is made amorphous in the interior of the silicon substrate 1. In this process, the laser beams are focused at positions of a depth of 10% from the front surface of the silicon substrate 1, and the transformed layer 8 in the form of rows extending along the longer side direction of the silicon substrate (substrate for inkjet head) 1 is formed by laser processing utilizing multi-photon absorption. In other words, as shown in FIG. 8, the transformed layer 8 is formed in rows that are parallel to the direction of the longer side of an ink supply port in the form of an elongated penetrated hole to be formed in the silicon substrate 1. The transformed layer 8 is made amorphous, whereby its etching rate is made relatively higher.

In this embodiment, the transformed layer 8 was formed in four rows along the longer side of the silicon substrate 1 in a plane parallel to the front (or back) surface of the silicon substrate 1. The rows of the transformed layer 8 thus formed were arranged at a pitch of 33 μm in the direction of the shorter side of the silicon substrate 1. The transformed layer 8 was formed using laser beams of the basic wave (having a wavelength of 1060 nm) of the YAG laser. The output power and the frequency of the laser beams were adjusted appropriately.

Figure 7B:
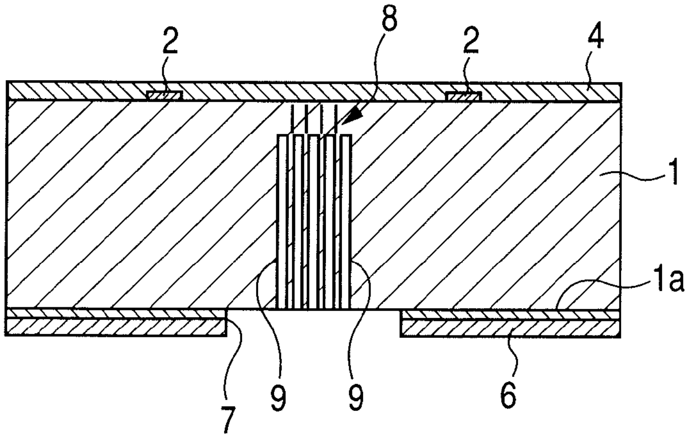

Next, the silicon substrate 1 is irradiated with laser beams from the back side, whereby a plurality of leading holes 9 in the form of non-penetrated holes that do not penetrate through the silicon substrate 1 from the back surface to the front surface thereof are formed from the back surface toward the front surface of the silicon substrate 1, as shown in FIG. 7B. In the process of forming the leading holes 9, laser beams of the third harmonic generation wave (THG, having a wavelength of 355 nm) of the YAG laser were used to form the leading holes 9. The output power and the frequency of the laser beams were adjusted appropriately. In this embodiment, the leading holes 9 thus formed had a diameter $\phi$ of approximately 40 μm. It is preferred that the diameter $\phi$ of the leading holes 9 be within the range of, approximately, 5 μm to 100 μm. Leading holes having too small diameters are not desirable, because in this case, etching liquid is hard to be introduced into the leading holes in the anisotropic etching that is to be performed in the succeeding process. On the other hand, leading holes having too large diameters are not desirable, because in this case, it takes a relatively long time to form leading holes having a desired depth. The depth of the leading holes thus formed were within the range of 500 μm to 575 μm from the back surface of the silicon substrate 1.

The leading holes 9 were arranged in five rows that are parallel to the longer side of the silicon substrate 1 in the region parallel to the front surface of the silicon substrate 1 in the transformed layer 8. The leading holes 9 were formed in such a way that the end of each leading hole 9 reaches the transformed layer 8. The plurality of leading holes 9 were formed in five rows arranged at a pitch of 33 μm with respect to the direction of the shorter side of the silicon substrate 1. Similarly, the leading holes 9 are formed in rows arranged at a pitch of 33 μm with respect to the direction of the longer side of the silicon substrate 1. The leading holes 9 are formed in one or multiple rows arranged symmetrically with respect to the center line of the region of the transformed layer 8.

Figure 7C:
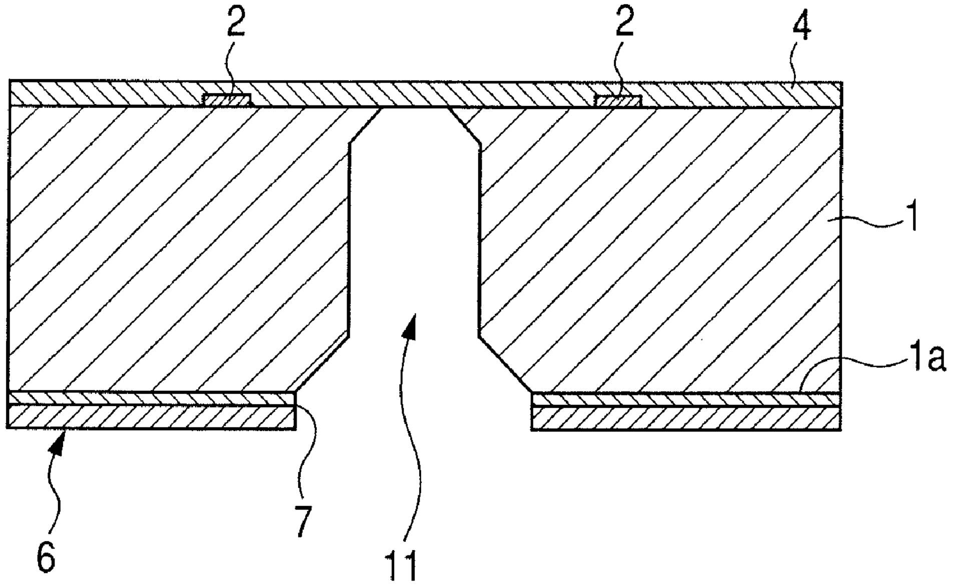

Next, the portion of the $SiO_2$ layer 1*a* within the opening 7 of the etching mask layer 6 formed on the back surface of the silicon substrate 1 is removed to expose the Si surface of the silicon substrate 1 from which anisotropic etching is to proceed, as shown in FIG. 7C. Thereafter, an ink supply port 11 in the form of a penetrated hole is formed. Specifically, the portion of the $SiO_2$ layer 1*a* on the back surface of the silicon substrate 1 is removed within the region of the opening 7 of the etching mask layer 6 made of a polyether amide formed on the back surface of the silicon substrate 1.

Then, the silicon substrate 1 is immersed in a strong alkaline solution such as TMAH or KOH to perform crystal anisotropic etching. In this etching process, etching proceeds from all the inner surfaces of the plurality of leading holes 9. In some portions, the etching proceeds while forming a <111> surface on which the etching rate is low. In other portions, etching proceeds along a <001> surface and a <011> surface on which the etching rate is high. In this process, <111> surfaces are formed from the ends of the leading holes 9 that are located on the outer circumference in the array of the plurality of leading holes 9. The transformed layer 8 formed inside the front surface on the silicon substrate 1 in which the etching rate is relatively high is removed by etching. Such wet etching was performed until an ink supply port that penetrates through the silicon substrate 1 to the front surface of the silicon substrate 1 was formed. Further, a part of a passivation layer 4 existing on the opening of the ink supply port 11 on the front surface of the silicon substrate 1 was removed by dry etching, though not shown in the drawings. Thus, an ink supply port 11 that opens on the front surface of the silicon substrate 1 was formed.

By performing the above described process, the etching time in crystal anisotropic etching, which had been sixteen hours conventionally, could be reduced to three hours. Thanks to the reduction of the etching time in crystal anisotropic etching, the width of the opening of the ink supply port on the back surface of the silicon substrate, which had been 1 mm conventionally, can be reduced to 0.5 mm. Thus, the size of the inkjet head can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-231354, filed Sep. 6, 2007, and Japanese Patent Application No. 2007-231355, filed Sep. 6, 2007, which are hereby incorporated by reference herein in their entirety.

What is claimed is:

1. A method of manufacturing a substrate for a liquid discharge head including a silicon substrate in which a liquid supply port is provided, comprising:

providing the silicon substrate, an etching mask layer having an aperture being formed on one surface of the silicon substrate;

forming a region comprising amorphous silicon in the interior of the silicon substrate by irradiating the silicon substrate with laser light;

forming a recess, which has an opening at a part of a portion exposed from the aperture on the one surface, from the one surface of the silicon substrate toward the region; and forming the supply port by performing etching on the silicon substrate in which the recess and the region have been formed from the one surface through the aperture of the etching mask layer.

2. A method according to claim 1, wherein the recess is formed in such a way that an end of the recess reaches the region.

3. A method according to claim 1, wherein the region is formed at a position deeper than 80% of the thickness of the silicon substrate from the one surface.

4. A method according to claim 1, wherein the region is formed at a position between the one surface of the silicon substrate and a surface opposite to the one surface.

5. A method according to claim 1, wherein the recess is formed in a frame-like shape on the one surface.

6. A method according to claim 1, wherein the region is formed utilizing multi-photon absorption occurring inside the silicon substrate by irradiating the silicon substrate with laser light.

7. A method according to claim 1, wherein the recess is formed by laser light.

8. A method according to claim 1, wherein the region is arranged in a row inside the silicon substrate.

9. A method according to claim 1, wherein the etching comprises wet etching.

10. A method according to claim 1, wherein the region comprising amorphous silicon is formed at intervals in a lateral direction of the silicon substrate.

11. A method of manufacturing a substrate for a liquid discharge head including a silicon substrate in which a liquid supply port is provided, comprising:

forming a region comprising amorphous silicon in the interior of the silicon substrate by irradiating the silicon substrate with laser light;

forming a recess, which has an opening at a part of one surface of the silicon substrate, from the one surface of the silicon substrate toward the region; and forming the supply port by performing etching on the silicon substrate, in which the recess and the region have been formed, from the one surface.

12. A method of manufacturing a substrate for a liquid discharge head including a silicon substrate in which a liquid supply port is provided, comprising:

forming a recess extending from one surface of the silicon substrate toward a back surface opposite to the one surface;

forming a region comprising amorphous silicon between an end of the recess in the silicon substrate and the back surface by irradiating the silicon substrate with laser light; and forming the supply port by performing etching on the silicon substrate in which the recess and the region have been formed, from the one surface.

13. A method of processing a silicon substrate, comprising:

providing the silicon substrate, an etching mask layer having an aperture being formed on a one surface of the silicon substrate;

forming a region comprising amorphous silicon in the interior of the silicon substrate by irradiating the silicon substrate with laser light;

forming a recess, which has an opening at a part of the one surface, from the one surface of the silicon substrate toward the region, through the aperture on the one surface; and forming a penetrated hole by performing etching in the silicon substrate in which the recess and the region have been formed, from the one surface.

* * * * *